United States Patent [19]

Aydin et al.

[11] Patent Number: 5,430,092
[45] Date of Patent: Jul. 4, 1995

[54] PREPARATION OF AN AQUEOUS POLYMER DISPERSION

[75] Inventors: Oral Aydin, Mannheim; Josef Neutzner, Neustadt; Walter Maechtle, Ludwigshafen, all of Germany

[73] Assignee: BASF Aktiengesellschaft, Ludwigshafen, Germany

[21] Appl. No.: 202,460

[22] Filed: Feb. 28, 1994

[30] Foreign Application Priority Data

Mar. 11, 1993 [DE] Germany ............... 43 07 683.1

[51] Int. Cl.⁶ .................................................. C08L 9/08
[52] U.S. Cl. .................................. 524/458; 524/460
[58] Field of Search ............... 524/460, 458, 162, 161, 524/159, 160

[56] References Cited

U.S. PATENT DOCUMENTS

| | | | |
|---|---|---|---|
| 3,424,706 | 1/1969 | Smith et al. | |
| 4,017,442 | 4/1977 | Gibbs et al. | 524/460 |
| 4,130,523 | 12/1978 | Hoy et al. | |
| 4,456,726 | 6/1984 | Siol et al. | |
| 4,539,361 | 9/1985 | Siol et al. | 524/460 |
| 5,189,107 | 2/1993 | Kasai et al. | |

FOREIGN PATENT DOCUMENTS

| | | |
|---|---|---|
| 0081083 | 6/1983 | European Pat. Off. |
| 0081083A3 | 6/1983 | European Pat. Off. |
| 0129699A3 | 1/1985 | European Pat. Off. |
| 0129699 | 1/1985 | European Pat. Off. |
| 359562 | 3/1990 | European Pat. Off. |
| 0387855A3 | 9/1990 | European Pat. Off. |
| 4213964 | 11/1993 | Germany. |
| 4213965 | 11/1993 | Germany. |
| 4213967 | 11/1993 | Germany. |
| 4213968 | 11/1993 | Germany. |
| 4213969 | 11/1993 | Germany. |
| 2245274 | 1/1992 | United Kingdom. |

*Primary Examiner*—Jeffrey T. Smith
*Attorney, Agent, or Firm*—Oblon, Spivak, McClelland, Maier & Neustadt

[57] ABSTRACT

In a process for preparing a final aqueous polymer dispersion having a solids volume concentration of 50% by volume or more, free-radically polymerizable monomers other than vinyl or vinylidene halides are subjected to a free radical aqueous emulsion polymerization by the feed stream addition process in the presence of an aqueous starting polymer dispersion whose dispersed starting polymer particles have a certain minimum diameter.

7 Claims, No Drawings

PREPARATION OF AN AQUEOUS POLYMER DISPERSION

The present invention relates to a novel process for preparing an aqueous polymer dispersion having a solids volume concentration (solids volume=solids mass divided by solids density) of at least 50% by volume, wherein at least one free-radically polymerizable monomer other than a vinyl or vinylidene halide is polymerized with the addition of at least one aqueous starting polymer dispersion I in a polymerization vessel by the method of free radical aqueous emulsion polymerization in the presence of dispersants and free radical polymerization initiators.

The present invention also relates to the use of the direct products of the process as binders and as materials for preparing coatings and adhesive joints.

Polymer solutions form polymer films as the solvent evaporates. Aqueous polymer dispersions behave the same way on evaporation of the aqueous dispersion medium, which is why aqueous polymer dispersions find varied use as binders, for example for paints or for compositions for coating leather, paper or plastic film.

Aqueous polymer dispersions having a high polymer content are of particular advantage in that, on the one hand, their relatively lower proportion of aqueous dispersion medium reduces the energy required for evaporating it, for example for film formation or for preparing polymer powders, and, on the other, the useful polymer can be stored and transported using a relatively smaller amount of aqueous phase as carrier medium.

However, there is a disadvantage in that, as the volume concentration of the polymer increases (U.S. Pat. No. 4,130,523), there are problems with the preparation of aqueous polymer dispersions. For instance, the flow resistance (viscosity) increases and this increased viscosity makes it difficult not only to remove the heat of reaction but also to process the aqueous dispersion; secondly, there is an increasing tendency for the dispersed polymer particles to aggregate for reasons of thermodynamic stability. The resulting flocs [a) microflocs or specks; not normally removable by conventional filtration; b) macroflocs or coagulum; normally removable by conventional filtration] interfere in particular with the film forming of the aqueous polymer dispersions and are therefore generally undesirable.

According to studies about the flow resistance of aqueous polymer dispersions, those having a broad size distribution (polydispersity) of the dispersed polymer particles for the same solids content generally have a lower flow resistance than those with a narrow size distribution (which are in the extreme case monodispersed). Furthermore, coarse aqueous polymer dispersions have a lower flow resistance than fine aqueous polymer dispersions, given the same solids content.

EP-A-129 699 discloses a process for preparing an aqueous polymer dispersion wherein unsaturated monomers are polymerized in a conventional manner in a polymerization vessel by the method of free radical aqueous emulsion polymerization with the addition of an aqueous dispersion of a starting polymer such that the addition of the aqueous dispersion of the starting polymer must be concluded before 40% by weight of the total monomers to be polymerized have copolymerized and must not start before the average particle size of the emulsion polymer formed in the course of the polymerization of the monomers is twice that of the aqueous dispersion of the starting polymer. In fact, the aqueous dispersion of the starting polymer is preferably not added over a prolonged period but all at once.

The disadvantages of the aqueous polymer dispersions thus obtainable are that their flow resistance is not fully satisfactory above a solids volume concentration of 50% by volume and that, according to the embodiment examples, the solids volume concentration is limited to values below 65% by volume.

U.S. Pat. No. 4,130,523 concerns a process for preparing aqueous polymer dispersions wherein aqueous polymer dispersion already formed in the course of the polymerization process is continuously removed from the reaction zone, stored and later reintroduced into the reaction zone as a kind of starting polymer dispersion. A disadvantage of this process is that it is unsuitable for industrial implementation.

U.S. Pat. No. 3,424,706 concerns a process for preparing aqueous dispersions of polymers containing at least 70–97% by weight of vinylidene chloride as copolymerized units, wherein the polymerization of the monomers is effected with the addition of an aqueous dispersion of a starting polymer. The said reference teaches inter alia mixing the monomers to be polymerized and the aqueous dispersion of the starting polymer with one another and adding this mixture to the initial charge comprising part of the polymerization batch.

The disadvantage with this process is that it is restricted to monomer mixtures consisting chiefly of vinylidene chloride. Moreover, according to the illustrative embodiments, the aqueous polymer dispersions obtainable by this process are unsatisfactory not only as regards the flow resistance above a solids volume concentration of 50% by volume but also as regards the upper limit for the solids volume concentration attainable in a still satisfactorily flowable state.

EP-A-81 083 discloses a process for preparing an aqueous highly concentrated bimodal polymer dispersion, which is characterized in that ethylenically unsaturated monomers are polymerized with the addition of an aqueous starting dispersion A of a starting polymer A and an aqueous starting dispersion B of a starting polymer B by the method of free radical aqueous emulsion polymerization with the proviso that the weight average diameters of the polymer particles A and B differ from each other by a factor of from 2 to 15 and the total weight of the added starting polymers A and B, based on the weight of the resulting end polymer, is not less than 5 and not more than 80% by weight. The disadvantage with this process is that it necessarily requires the preparation of two aqueous starting polymer dispersions. Furthermore, satisfactory aqueous polymer dispersions are evidently obtained by this process only when the total weight of the added starting polymers A and B, based on the weight of the resulting end polymers, is at least 60% by weight. At least, all the illustrative embodiments of EP-A-81 083 satisfy that proviso.

GB-A-2 245 274 discloses a process for preparing aqueous polymer dispersions whose polymer particle diameters are distributed over a wide range. The process is characterized by a certain course of the emulsifier concentration along the polymerization path. The disadvantage with this process is that it is not very suitable for industrial reproducible production of aqueous polymer dispersions having a solids volume concentration $\geq 50\%$ by volume, which is why the solids volume concentration of the only illustrative embodiment is indeed below 20% by volume.

The earlier application DE-A-4 213 965 (O.Z. 0050/43182) relates to a process for preparing an aqueous polymer dispersion having a solids volume concentration of at least 50% by volume, said process being inter alia characterized in that at least one free-radically polymerizable monomer is polymerized with the addition of an aqueous dispersion of a starting polymer by the method of free radical aqueous emulsion polymerization with the proviso that the weight average particle diameter of the polymer particles of the aqueous dispersion of the starting polymer is $\leq 50$ nm.

The earlier application DE-A 4 213 964 (O.Z. 0050/43183) relates to a process for preparing an aqueous polymer dispersion, which process is inter alia characterized in that free-radically polymerizable monomers are polymerized with the addition of an aqueous dispersion of a starting polymer by the method of free radical aqueous emulsion polymerization with the proviso that the weight average particle diameter of the polymer particles of the aqueous dispersion of the starting polymer is from 10 to 100 nm.

The earlier application DE-A 4 213 967 (O.Z. 0050/43184) relates to a process for preparing an aqueous polymer dispersion having a solids volume concentration of at least 50% by volume, which process is inter alia characterized in that at least one free-radically polymerizable monomer is polymerized with the addition of at least one aqueous starting dispersion I of a starting polymer I and with addition of at least one aqueous starting dispersion II of a starting polymer II by the method of free radical aqueous emulsion polymerization with the proviso that the weight average particle diameter of the polymer particles of the aqueous starting dispersion I is $\leq 50$ nm.

The earlier application DE-A 4 213 968 (O.Z. 0050/43185) relates to a process for preparing an aqueous polymer dispersion having a solids volume concentration of at least 50% by volume, which process is inter alia characterized in that free-radically polymerizable monomers are polymerized with the addition of at least one aqueous starting dispersion I of a starting polymer I and with addition of at least one aqueous starting dispersion II of a starting polymer II by the method of free radical aqueous emulsion polymerization with the proviso that at least 1% by weight of the total mass of the starting polymer particles I has a non-zero particle diameter $\leq 50$ nm.

The earlier application DE-A 4 213 969 (O.Z. 0050/43186) relates to a process for preparing an aqueous polymer dispersion having a solids volume concentration of at least 50% by volume, which process is inter alia characterized in that free-radically polymerizable monomers are polymerized with the addition of at least one aqueous starting dispersion I of a starting polymer I by the method of free radical aqueous emulsion polymerization with the proviso that the aqueous starting dispersion I contains not only starting polymer particles having a diameter within the range of >0 to 100 nm but also starting polymer particles having a diameter within the range from >100 nm to 400 nm and the volumes of the various polymer particle fractions satisfying certain relations. In all the illustrative embodiments the starting dispersion I includes at least 0.6% by weight, based on the total amount of the starting polymers I, of starting polymer particles whose particle diameter is essentially $\leq 40$ nm.

It is an object of the present invention to make available a process for preparing aqueous polymer dispersions having a solids volume concentration $\geq 50\%$ by volume, a reduced flow resistance and a reduced floc content, by polymerizing at least one free-radically polymerizable monomer other than a vinyl or vinylidene halide with the addition of at least one aqueous starting polymer dispersion I in a polymerization vessel in a simple, industrially suitable, reproducible manner not restricted to specific monomers by the method of free radical aqueous emulsion polymerization in the presence of dispersants and free radical polymerization initiators.

We have found that this object is achieved by a process for preparing a final polymer dispersion having a solids volume concentration of at least 50% by volume by polymerizing at least one free-radically polymerizable monomer other than a vinyl or vinylidene halide with the addition of at least one aqueous starting polymer dispersion I in a polymerization vessel by the method of free radical aqueous emulsion polymerization in the presence of dispersants and free radical polymerization initiators, wherein a) the mass of starting polymer I present in the at least one added aqueous starting polymer dispersion I is relative to the total mass, comprising the mass of the at least one free-radically polymerizable monomer and the mass of starting polymer I added in the form of the aqueous starting polymer dispersion I, from 0.1 to 10%, preferably from 0.5 to 5%, b) the starting polymer I is present in the at least one aqueous starting dispersion I in the form of dispersed starting polymer particles of whose total mass at least 99.6% by weight have a non-zero particle diameter of $\geq 90$ nm to $\leq 500$ nm, preferably from $\geq 110$ to 500 nm, c) the total amount of the at least one aqueous starting polymer dispersion I to be added is introduced into the polymerization vessel as initial charge prior to the start of free radical aqueous emulsion polymerization, d) in a first polymerization stage, in the presence of the initial charge of aqueous starting polymer dispersion I, initially an aliquot of from 25 to 500% by weight, preferably from 50 to 300% by weight, of the total mass of the at least one monomer to be free-radically polymerized, based on the mass of the initial charge of starting polymer I, is polymerized in a conventional manner to a conversion of at least 80 mol %, preferably at least 90 mol %, based on this aliquot, e) following the first polymerization stage the polymerization of the remainder of the at least one monomer to be free-radically polymerized is effected by the feed stream addition method with the proviso that from the start of the feed stream addition method the addition of the at least one free-radically polymerizable monomer to the polymerization vessel is effected in such a way that at any time of the addition the polymerization conversion of the total monomers already added previously to the polymerization vessel is at least 80 mol %, and f) the amount of dispersant present in the polymerization vessel is at any time from the start of the free radical aqueous emulsion polymerization from 0.5 to 5% by weight, preferably from 0.5 to 3% by weight based on the sum of the masses already introduced into the polymerization vessel of starting polymer I and of monomers to be polymerized.

Remarkably, the process of the invention is not restricted to the free radical aqueous emulsion polymerization of monomer mixtures composed chiefly or exclusively of vinyl and/or vinylidene halides, despite the generally known fact that the development of the disperse phase in the case of monomers other than vinyl and/or vinylidene halides is a significantly more complex phenomenon.

Suitable free-radically polymerizable monomers for the process of the invention are therefore in particular, inter alia, monoethylenically unsaturated monomers such as olefins, for example ethylene, aromatic vinyl monomers such as styrene, α-methylstyrene, o-chlorostyrene or vinyltoluenes, esters of vinyl alcohol and monocarboxylic acids having from 1 to 18 carbon atoms, such as vinyl acetate, vinyl propionate, vinyl-n-butyrate, vinyl laurate and vinyl stearate, esters of $\alpha,\beta$-monoethylenically unsaturated mono- and dicarboxylic acids preferably of from 3 to 6 carbon atoms, such as, in particular, acrylic acid, methacrylic acid, maleic acid, fumaric acid and itaconic acid, with alkanols in general of from 1 to 12, preferably of from 1 to 8, in particular of from 1 to 4, carbon atoms, such as, in particular, methyl, ethyl, n-butyl, isobutyl and 2-ethylhexyl acrylate and methacrylate, dimethyl maleate or n-butyl maleate, nitriles of $\alpha,\beta$-monoethylenically unsaturated carboxylic acids such as acrylonitrile and also $C_{4-8}$-conjugated dienes such as 1,3-butadiene and isoprene. The monomers mentioned generally form the principal monomers which, based on the total amount of the monomers to be polymerized by the method of free radical aqueous emulsion polymerization, normally account for a proportion of more than 50% by weight. Monomers which polymerized by themselves normally form homopolymers that possess enhanced water solubility are normally included in the polymer only as modifying monomers, in amounts, based on the total amount of monomers to be polymerized, of less than 50% by weight, in general up to 20, preferably from 0.1 to 10% by weight.

Examples of monomers of this type are $\alpha,\beta$-monoethylenically unsaturated mono- and dicarboxylic acids of from 3 to 6 carbon atoms and amides thereof, eg. acrylic acid, methacrylic acid, maleic acid, fumaric acid, itaconic acid, acrylamide and methacrylamide, also vinylsulfonic acid and water-soluble salts thereof, and also N-vinylpyrrolidone. Monomers which customarily enhance the internal strength of the films formed from the final aqueous polymer dispersion are in general likewise included in the polymer only in minor amounts, usually from 0.5 to 10% by weight, based on the total amount of monomers to be polymerized. Monomers of this type normally have an epoxy, hydroxyl, N-methylol, carbonyl or at least two nonconjugated ethylenically unsaturated double bonds. Examples thereof are N-alkylolamides of $\alpha,\beta$-monoethylenically unsaturated carboxylic acids of from 3 to 10 carbon atoms and esters thereof with alcohols of from 1 to 4 carbon atoms, of which N-methylolacrylamide and N-methylolmethacrylamide are very particularly preferred, divinyl monomers, divinylidene monomers and also dialkenyl monomers. Particularly suitable instances of these are the diesters of dihydric alcohols with $\alpha,\beta$-monoethylenically unsaturated monocarboxylic acids, of which in turn acrylic and methacrylic acid are preferred. Examples of such monomers having two nonconjugated ethylenically unsaturated double bonds are alkylene glycol diacrylates and dimethacrylates such as ethylene glycol diacrylate, 1,3-butylene glycol diacrylate, 1,4-butylene glycol diacrylate, propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate. In this connection of particular importance are also $C_1$-$C_8$-hydroxyalkyl methacrylates and acrylates, such as n-hydroxyethyl, n-hydroxypropyl or n-hydroxybutyl acrylate and methacrylate, and also compounds such as diacetoneacrylamide and acetylacetoxyethyl acrylate or methacrylate. As well as monomers having unsaturated double bonds it is possible for minor amounts, customarily from 0.01 to 2% by weight, based on the monomers to be polymerized, of molecular weight regulators, such as tert-dodecyl mercaptan and 3-mercaptopropyltrimethoxysilane to be included in the polymer. It is preferable to add such substances to the polymerization zone mixed with the monomers to be polymerized.

Suitable dispersants include not only the protective colloids customarily used for carrying out free radical aqueous emulsion polymerizations but also emulsifiers. Examples of suitable protective colloids are polyvinyl alcohols, cellulose derivatives and vinylpyrrolidone-containing copolymers. A detailed description of further suitable protective colloids may be found in Houben-Weyl, Methoden der organischen Chemie, Volume XIV/1, Makromolekulare Stoffe, Georg Thieme Verlag, Stuttgart, 1961, pages 411 to 420. It is of course also possible to use mixtures of emulsifiers and/or protective colloids. Preferably, the dispersants used are exclusively emulsifiers whose relative molecular weights are customarily below 1000, in contradistinction to the protective colloids. They can be anionic, cationic or nonionic in nature. Of course, if mixtures of surface active substances are used, the individual components must be compatible with one another, which can be verified beforehand by means of a few preliminary experiments if there is any doubt. In general, anionic emulsifiers are compatible with one another and with nonionic emulsifiers. The same is true of cationic emulsifiers, while anionic and cationic emulsifiers are usually incompatible with one another. Examples of customary emulsifiers are ethoxylated mono-, di- and trialkylphenols (EO degree: 3–50, alkyl radical: $C_4$–$C_9$), ethoxylated fatty alcohols (EO degree: 0–50, alkyl radical: $C_8$–$C_{36}$), and also alkali metal and ammonium salts of alkyl sulfates (alkyl radical: $C_8$–$C_{12}$), of sulfuric monoesters of ethoxylated alkanols (EO degree: 0–30, alkyl radical: $C_{10}$–$C_{18}$), and ethoxylated alkylphenols (EO degree: 3–50, alkyl radical: $C_4$–$C_{15}$), of alkylsulfonic acids (alkyl radical: $C_9$–$C_{18}$) and of alkylarylsulfonic acids (alkyl radical: $C_9$–$C_{18}$). Further suitable emulsifiers may be found in Houben-Weyl, Methoden der organischen Chemie, Volume XIV/1, Makromolekulare Stoffe, Georg-Thieme Verlag, Stuttgart, 1961, pages 192 to 208.

Particularly suitable surface active substances are compounds of the general formula I

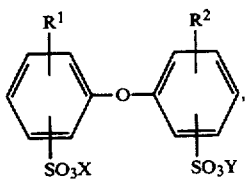

(I)

where $R^1$ and $R^2$ are each hydrogen or $C_4$–$C_{24}$-alkyl but are not both hydrogen, and X and Y are each an alkali metal or ammonium ion. In the formula I, $R^1$ and $R^2$ are each preferably linear or branched alkyl radicals of from 6 to 18 carbon atoms or hydrogen, in particular of 6, 12 and 16 carbon atoms, but $R^1$ and $R^2$ must not both be hydrogen. X and Y are each preferably sodium, potassium or ammonium ions, of which sodium is particularly preferred. Of particular advantage are compounds I in which X and Y are each sodium, $R^1$ is a branched alkyl radical of 12 carbon atoms and $R^2$ is hydrogen or $R^1$. It is common to employ technical grade mixtures containing from 50 to 90% by weight of the monoalkylated product, for example Dowfax® 2A1 (trademark of the Dow Chemical Company). Compounds I are generally known, for example from U.S. Pat. No. 4,269,749, and are commercially available. It is advantageous for the final aqueous polymer dispersion of the invention to contain from 1 to 3% by weight of surface active substances, based on the mass of the final polymer.

Suitable free radical polymerization initiators are all those which are capable of initiating a free radical aqueous emulsion polymerization. This includes not only peroxides, for example alkali metal peroxodisulfates, but also azo compounds. Preference is given to using combined systems composed of at least one organic reducing agent and at least one peroxide and/or hydroperoxide, eg. tert-butyl hydroperoxide and the sodium salt of hydroxymethanesulfinic acid or hydrogen peroxide and ascorbic acid, and very particular preference is given to combined systems which in addition contain a small amount of a metal compound that is soluble in the polymerization medium and whose metallic component can exist in a plurality of valence states, for example ascorbic acid/iron(II) sulfate/hydrogen peroxide, although instead of ascorbic acid it is also common to employ the sodium salt of hydroxymethanesulfinic acid, sodium sulfite, sodium bisulfite or sodium metabisulfite and instead of hydrogen peroxide it is common to employ tert-butyl hydroperoxide or alkali metal peroxodisulfates and/or ammonium peroxodisulfate. Instead of a water-soluble iron(II) salt it is common to employ a candium salt or a combination of water-soluble Fe/V salts. The amount of free radical initiator system used is preferably from 0.1 to 2% by weight, based on the total amount of monomers to be polymerized.

The manner of addition of the free radical initiator system to the polymerization vessel in the course of the free radical aqueous emulsion polymerization of the invention is rather of minor importance for the success of the process of the invention. The initiator system can not only be introduced into the polymerization vessel in its entirety as part of the initial charge but also be added continuously or stepwise in the course of the free radical aqueous emulsion polymerization at the rate of its consumption. The choice in a particular case depends in the usual fashion not only on the chemical nature of the initiator system but also on the polymerization temperature.

The polymerization pressure and the polymerization temperature are likewise of rather minor importance. In general, the temperature employed will be between room temperature and 100° C., preferably within the range from 50° to 95° C. The employment of superatmospheric or reduced pressure is possible, so that the polymerization temperature may also exceed 100° C. and may in fact be as high as 130° C. Volatile monomers such as ethylene, butadiene or vinyl chloride are preferably polymerized under superatmospheric pressure. To control the pH of the polymerization medium, ammonia or an alkali metal hydroxide, for example, may be added during the free radical aqueous emulsion polymerization of the invention.

The free-radically polymerizable monomers mentioned by way of example as suitable for the free radical aqueous emulsion polymerization of the invention are suitable not only for use as constituents of the monomer mixture to be polymerized according to the invention, but also, in the same way as the polymerization initiators, molecular weight regulators and pH regulators recommended for the free radical aqueous emulsion polymerization of the invention, for use as constituents of the starting polymers I and of the starting polymer dispersions containing these, although the monomer, regulator and initiator composition for the preparation of the aqueous starting polymer dispersions I can be not only congruent with but also different from that for the process of the invention. This necessarily applies mutatis mutandis also to the surface active substances to be used for preparing the aqueous starting polymer dispersions I.

The preparation of aqueous starting polymer dispersions I is known per se. Appropriate teaching may be found for example in Houben-Weyl, Methoden der organischen Chemie, Volume E20, part I, Makromolekulare Stoffe, Georg-Thieme Verlag, Stuttgart, 1987, pages 248 to 268. Initially, it is advantageous to prepare a finely divided starting polymer dispersion I' whose weight average particle diameter is >0, ≦80 nm. Such aqueous starting polymer dispersions I' are obtainable in a particularly simple manner, for example by mixing together the aqueous phase, the monomers, the free radical initiators (normally from 0.1 to 5% by weight, based on the amount of starting monomers to be polymerized), and dispersants (customarily from 10 to 50% by weight, based on the amount of starting monomers to be polymerized) at a low temperature and heating the mixture to the polymerization temperature and polymerizing it (the weight average particle diameter generally decreases with increasing amounts of dispersant). In another version, the initial charge comprises essentially all the components, but the polymerization initiator is added continuously after the charge has been heated to the reaction temperature and while it is maintained at that temperature. As regards polymerization temperature and pressure, the statements concerning the process of the invention apply.

From thus obtainable relatively finely divided aqueous starting polymer dispersions I', usually from 20 to 40% in strength by weight, coarsely divided aqueous starting polymer dispersions I are obtainable for example by introducing a finely divided aqueous starting polymer dispersion I' into a polymerization vessel as initial charge, heating to the polymerization temperature and then adding to the polymerization vessel at the rate of their consumption further monomers, customarily preemulsified in aqueous medium, and polymerization initiator while the polymerization temperature is maintained. The amount of emulsifier added as part of the aqueous monomer emulsion is determined in such a way that the total amount of dispersant present in the resulting more coarsely divided aqueous starting polymer dispersion I is from 0.5 to 5, preferably from 0.5 to 3% by weight, based on the resulting coarsely divided starting polymer I. Frequently, the polymerization medium is preheated to the polymerization temperature and an aliquot of the coarsening monomer emulsion is added to it all at once, followed by polymerization initiator and incipient polymerization, before the remainder of the monomer emulsion and of the polymerization initator is added. The particle enlargement to be obtained is essentially determined by the ratio of initially charged finely divided starting polymer I' particles and added monomers. Of course, there can be a smooth transition from the process of preparing a relatively finely divided aqueous starting polymer dispersion I' to the process of particle size enlargement. The statements about polymer particle diameters of the aqueous starting polymer dispersions I' and I here always relate to determinations by means of an analytical ultracentrifuge (W. Mächtle, Makromolekulare Chemie 185 (1984), 1025–1039). The determinations of the polymer particle size distribution of the final aqueous polymer dispersions were carried out in the analytical ultracentrifuge using the coupling PSD technique (cf. W. Mächtle, Angewandte Makromolekulare Chemie 162 (1988), 35–42 (no. 2735)).

It is also advantageous to use aqueous starting polymer dispersions I that are mixtures of different, essentially monodisperse aqueous starting polymer dispersions $I_n$ whose particle diameter distribution functions essentially do not overlap. Usually their monodispersity is such that, when $d_x$ defines the diameter below which are the particle diameters of X % by weight of all the starting polymer particles present in the respective aqueous starting dispersion $I_n$, the ratio $(d_{90}-d_{10})/d_{50}$ has a value of from 0.1 to 0.6.

Furthermore, the mixing is effected in such a way that the relation between the volume $V_{I,i}$, obtainable by dividing the mass of the i-th starting polymer $I_i$ present in the i-th aqueous starting polymer dispersion $I_i$ by the mass density of the i-th starting polymer $I_i$, and the similarly determined volume $V_{I,j}$ satisfies equation 1

$$V_{I,i} = V_{I,j} \cdot k \left( \frac{d_{w,Ii}}{d_{w,Ij}} \right)^2, \quad (1)$$

where k is from 1/1.5 to 1.5, preferably from 0.9 to 1.1, and $\bar{d}_{w,In}$ is the weight average particle diameter. From an application point of view it is preferable for from 2 to 10, particularly preferably from 2 to 5, starting polymer dispersions In to be mixed with one another. The solids content of the aqueous starting polymer dispersions I is usually from 30 to 60% by weight.

Of course, the aqueous starting polymer dispersion I can also be polydisperse. Aqueous starting polymer dispersions I are for example obtainable by accompanying, in the coarsening of an aqueous starting polymer dispersion I', the monomer addition with a further addition of aqueous starting polymer dispersion I' (cf. the earlier application DE-A 4 213 965 (O.Z. 0050/43182)).

After the starting polymer dispersion I is present in the polymerization vessel the first polymerization stage is carried out. The monomers required for it can be added to the polymerization vessel in a conventional manner all at once and/or continuously.

If final polymer dispersions having a particularly high solids volume concentration are desired, it is advantageous to add the monomers to the polymerization vessel in the second polymerization stage by themselves. Otherwise the monomers to be free-radically polymerized are preferably added preemulsified in an aqueous phase, in which case the amount of emulsifier used for this purpose is advantageously from 0.5 to 3% by weight, based on the amount of emulsified monomer. Normally, the addition of monomer is accompanied by the addition, generally in the form of an aqueous solution and likewise continuously, to the polymerization vessel of the polymerization initiator required to maintain the polymerization. In fact, the duration of the initiator addition period preferably extends somewhat beyond the duration of the monomer addition period. There can of course be a smooth transition from the preparation of the aqueous starting polymer dispersion I to the subsequent polymerization stages in one and the same polymerization vessel. In the course of the feed stream addition process the polymerization vessel can naturally be supplied with additional dispersant, for example as a spatially separate stream or as part of the monomer emulsion.

Of course, in the course of the aqueous free radical emulsion polymerization of the invention it is possible for the composition of the monomers to be added to be changed during the feed stream addition process. Furthermore, the addition can take place not only stepwise but also continuously or by the gradient method. Preferably, the monomer addition takes place continuously.

On completion of the actual polymerization process of the invention the mixture is preferably stirred for some additional hours while the polymerization temperature is maintained. This may be followed by customary measures for residual monomer removal, for setting a different pH or other methods of post-stabilization, including the subsequent addition of dispersants. Of course, the various possible, generally spatially separate, feed streams can be mixed with one another immediately before entry into the polymerization vessel.

Preferred classes of final polymers are those composed

- to an extent of from 70 to 100% by weight of esters of acrylic and/or methacrylic acid with alkanols of from 1 to 12 carbon atoms and/or styrene or
- to an extent of from 70 to 100% by weight of styrene and/or butadiene, the class of the acrylates being particularly preferred.

The free radical aqueous emulsion polymerization of the invention makes it possible to produce in a simple manner final aqueous polymer dispersions which have a very wide final polymer particle size distribution which typically forms part of one of the following two particle size distribution specifications:

2–25% by weight of final polymer $\leq$ 200 nm
10–60% by weight of final polymer $\leq$ 400 nm
15–90% by weight of final polymer $\leq$ 600 nm
50–100% by weight of final polymer $\leq$ 800 nm or 2–15% by weight of final polymer $\leq$ 200 nm
12–50% by weight of final polymer $\leq$ 400 nm
25–60% by weight of final polymer $\leq$ 600 nm 50–95% by weight of final polymer ≦800 nm
60–100% by weight of final polymer ≦1400 nm It is presumably these specific particle size distributions which are responsible for the reduced flow resistance of the final aqueous polymer dispersion of the invention, which normally have Newtonian flow characteristics. Remarkably, they are obtained even when the aqueous starting polymer dispersions I do not contain any polymer particles having a diameter <110 nm.

Below a solids volume concentration of 50% by volume the effect of the particle size distribution on the flow resistance decreases progressively. The final aqueous polymer dispersions of the process of the invention are generally obtained as described in an industrially readily implementable manner with solids volume concentrations of up to 75% by volume with fully satisfactory reproducibility and no flocs.

The final aqueous polymer dispersions of the invention show their advantageous properties particularly markedly at solids volume concentrations above 65% by volume. They are generally suitable for use as binders and as materials for preparing coatings and adhesive joints, for which purpose they may have additionally mixed into them in a conventional manner assistants such as film forming aids, fillers or plasticizers.

EXAMPLES

EXAMPLE 1

Preparation of an aqueous starting polymer dispersion I' (SDI')

A mixture of
1.44 kg of n-butyl acrylate,
16.28 kg of water,
1.27 kg of a 45% strength by weight solution of the surface active substance corresponding to Dowfax 2A1, and
0.52 kg of a 30% strength by weight aqueous hydrogen peroxide solution was admixed all at once with 25% by weight of stream II at 25° C. After the onset of the exothermic polymerization had heated the mixture to 50° C. (which took about 10 min), the remainder of stream II and the entire amount of stream I were added continuously, starting at the same time, in the course of respectively 3 h and 2 h while the 50° C. were maintained. This was followed by an additional hour of stirring at 60° C.

Stream I:
47.0 kg of water,
14.7 kg of n-butyl acrylate,
14.7 kg of methyl methacrylate,
0.60 kg of methacrylic acid,
0.664 kg of a 45% strength by weight aqueous solution of the surface active substance corresponding to Dowfax 2A1

Stream II:
10 kg of water,
0.156 kg of ascorbic acid,
0.004 kg of iron(II) sulfate.

The result was an aqueous starting polymer dispersion SDI', characterized as follows:

Solids content: 30% by weight
$\bar{d}_{w,I'}$: 40 nm $$\left(\frac{d_{90} - d_{10}}{d_{50}}\right)_{I'}: 0{,}549$$

EXAMPLE 2

Preparation of aqueous starting polymer dispersions I (SDI$_1$ to SDI$_6$)

SDI$_1$: a mixture of
35 kg of water,
0.025 kg of ascorbic acid,
1.66 kg of SDI', and
1.55 kg of stream I was heated to 85° C. and then admixed all at once with 0.825 kg of stream II. While the 85° C. were maintained the batch was left to itself for 10 min for the polymerization to get under way. Thereafter, while the 85° C. were maintained, the polymerization mixture was continuously admixed, starting at the same time, with the remainder of stream I (in the course of 3 h) and the remainder of stream II (in the course of 4 h). This was followed by an additional hour of stirring.

Stream I:
49 kg of n-butyl acrylate,
1 kg of methacrylic acid,
1.79 kg of a 28% strength aqueous solution of the sodium salt of the sulfuric monoester of ethoxylated C$_{12}$ fatty alcohol (degree of EO: 25)=emulsifier solution 1
0.4 kg of a 25% strength aqueous sodium hydroxide solution, and
25.2 kg of water.

Stream II:
8 kg of water,
0.25 kg of sodium peroxodisulfate.

The result was an aqueous starting polymer dispersion SDI$_1$, characterized as follows:

Solids content: 39.5% by weight
$\bar{d}_{w,I1}$: 187 nm
Polymer particles having a diameter <90 nm were not detectable.

SDI$_2$: As for SDI$_1$, but the initial charge contained 1.77 kg of SDI'.

The result was an aqueous starting polymer dispersion SDI$_2$, characterized as follows:

Solids content: 40% by weight
$\bar{d}_{w,I2}$: 195 nm
Polymer particles having a diameter <90 nm were not detectable.

SDI$_3$: As for SDI$_1$, but the initial charge contained 0.667 kg of SDI'.

The result was an aqueous starting polymer dispersion SDI$_3$, characterized as follows:

Solids content: 41.4% by weight
$\bar{d}_{w,I3}$: 249 nm
Polymer particles having a diameter <90 nm were not detectable.

SDI$_4$: A mixture of
13.0 kg of water,
0.025 kg of ascorbic acid,
0.68 kg of SDI', and
1.35 kg of stream I was heated to 85° C. and then admixed all at once with 0.825 kg of stream II. While the 85° C. were maintained the batch was left to itself for 10 min for the polymerization to get under way. Thereafter, while the 85° C. were maintained, the polymerization mixture was continuously admixed, starting at the same time, with the remainders of stream I (13.5 kg in the course of 60 min, the rest in the course of 2.5 h) and of stream II (in the course of 4 h) and also, starting 1 h later, with stream III (in the course of 60 min).

Stream I:
49.0 kg of n-butyl acrylate,
1.0 kg of methacrylic acid,
1.79 kg of aqueous emulsifier solution 1,
0.2 kg of 25% strength aqueous sodium hydroxide solution,
15.6 kg of water Stream II:
8.0 kg of water
0.25 kg of sodium peroxodisulfate Stream III:
8.0 kg of water,
0.050 kg of ascorbic acid,
0.200 kg of 25% strength aqueous ammonia solution,
0.833 kg of SDI'.

The result was an aqueous starting polymer dispersion $SDI_4$, characterized as follows:
Solids content: 50% by weight
$\bar{d}_{w,I4}$:
Polymer particles having a diameter <90 nm were not detectable.

$SDI_5$: A mixture of
15.0 kg of water,
0.23 kg of SDI',
0.70 kg of a 30% strength by weight aqueous hydrogen peroxide solution, and
1.79 kg of stream I, was heated to 70° C. and then admixed all at once with 0.47 kg of stream II. While the 70° C. were maintained, the batch was left to itself for 5 min for the polymerization to get under way. Thereafter, while the 70° C. were maintained, the polymerization mixture was continuously admixed, starting at the same time, with the remainders of stream I (3.6 kg over 30 min, the rest in the course of 3 h) and of stream II (in the course of 4.5 h) and, starting 30 min later, with stream III (in the course of 60 min).

Stream I:
17.9 kg of water,
68.6 kg of n-butyl acrylate,
1.4 kg of methacrylic acid,
1.56 kg of a 45% strength by weight aqueous solution of the surface active substance corresponding to Dowfax 2A1 (emulsifier solution 2).

Stream II:
4.5 kg of water,
0.21 kg of ascorbic acid,
0.007 kg of iron(II) sulfate Stream III:
4.5 kg of water,
0.233 kg of SDI',
0.156 kg of aqueous emulsifier solution 2.

Subsequently the aqueous polymer dispersion was additionally stirred at 20° C. for 1 h. The result was an aqueous starting polymer dispersion SDIs, characterized as follows:
Solids content: 61% by weight,
$\bar{d}_{w,I5}$: 0.563
Polymer particles having a diameter <90 were not detectable.

$SDI_6$: A mixture of
2.56 kg of $SDI_1$,
3.31 kg of $SDI_2$, and
4.13 kg of $SDI_3$.

EXAMPLE 3

Preparation of aqueous final polymer dispersions FD1 to FD17

FD1: A mixture of
343 g of water,
41.6 g of stream I,
0.9 g of ascorbic acid, and
54 g of $SDI_4$ was heated to 85° C. and then admixed all at once with 25.9 g of stream II. While the 85° C. were maintained the batch was left to itself for 10 min for the polymerization to get under way. Thereafter, while the 85° C. were maintained, the polymerization mixture was continuously admixed, starting at the same time, with the remainders of stream I (in the course of 3 h) and stream II (in the course of 4 h) and thereafter held at 85° C. for a further 1 h. To remove residual monomer, the polymerization mixture was cooled down to 60° C. and then admixed all at once with stream III and thereafter, in the course of 1 h, while the 60° C. were maintained, continuously with stream IV.

Stream I:
1575 g of n-butyl acrylate,
180 g of acrylonitrile,
45 g of acrylic acid,
0.9 g of ascorbic acid,
14.4 g of 25% strength by weight aqueous NaOH solution,
64.3 g of aqueous emulsifier solution 1,
200 g of water Stream II:
9 g of sodium peroxodisulfate,
250 g of water Stream III:
36 g of a 10% strength by weight aqueous tert-butyl hydroperoxide solution Stream IV:
1.8 g of a 1% strength by weight aqueous $VOSO_4$ solution,
5 g of water,
3.6 g of sodium salt of hydroxymethanesulfinic acid.

FD2: As for FD1, but the initial charge was
350 g of water,
41.8 g of stream I,
0.9 g of ascorbic acid,
54 g of $SDI_4$ and, after heating to the polymerization temperature of 90° C., was admixed all at once with 52.5 g of stream II.

Stream I:
1440 g of 2-ethylhexyl acrylate,
144 g of vinyl acetate
144 g of methyl methacrylate,
36 g of n-hydroxypropyl acrylate,
36 g of styrene,
9 g of acrylic acid,
0.9 g of ascorbic acid,
1.8 g of tert-dodecyl mercaptan,
14.4 g of 25% strength by weight aqueous NaOH solution,
64.3 g of aqueous emulsifier solution 1,
200 g of water Stream II:
12.6 g of sodium peroxodisulfate,
250 g of water Stream III and stream IV as for FD1.

FD3: As for FD1, but the initial charge was 295 g of water,
  44.8 g of stream I,
  1 g of ascorbic acid,
  75.0 g of SDI$_1$
and, after heating to 85° C. was admixed all at once with 26.0 g of stream II.
  Stream I:
    1060 g of n-butyl acrylate,
    50 g of methacrylic acid,
    71.4 g of aqueous emulsifier solution 1,
    1 g of ascorbic acid,
    16.0 g of 25% strength by weight aqueous NaOH solution
    150 g of water.
  Stream II:
    10 g of sodium peroxodisulfate,
    250 g of water
  No stream III and no stream IV.
FD4: As for FD1, but the initial charge was
  272 g of water,
  44.8 g of stream I,
  1.0 g of ascorbic acid,
  125 g of SDI$_3$
and after heating to 85° C. was admixed all at once with 26.0 g of stream II.
  Stream I:
    60 g of n-butyl acrylate,
    40 g of methacrylic acid,
    71.4 g of aqueous emulsifier solution 1
    1 g of ascorbic acid,
    16 g of 25% strength by weight aqueous NaOH solution,
    150 g of water
  Stream II:
    10 g of sodium peroxodisulfate,
    250 g of water
  No stream III and no stream IV.
FD5: As for FD4, but instead of 125 g of SDI$_3$ the initial charge included the same amount of SDI$_6$.
FD6: As for FD1, but the initial charge was
  166 g of water,
  44.8 g of stream I,
  1.0 g of ascorbic acid,
  200 g of SDI$_6$
and after heating to the polymerization temperature of 90° C. was admixed all at once with 52.8 g of stream II.
  Stream I:
    1900 g of n-butyl acrylate,
    60 g of methyl methacrylate,
    40 g of methacrylic acid,
    1 g of tert-dodecyl mercaptan,
    16 g of 25% strength by weight aqueous NaOH solution,
    1 g of ascorbic acid,
    1.4 g of aqueous emulsifier solution 1
    150 g of water
  Stream II:
    14 g of sodium peroxodisulfate,
    250 g of water
  Stream III:
    40 g of a 10% strength by weight aqueous tert-butyl hydroperoxide solution
  Stream IV:
    4 g of sodium salt of hydroxymethanesulfinic acid,
    2 g of a 1% strength by weight aqueous VOSO$_4$ solution,
    40 g of water
FD7: As for FD6, but instead of 200 g of SDI$_6$ and 166 g of water the initial charge included 125 g of SDI$_6$ and 184 g of water. Furthermore, stream I did not contain 71.4 g of aqueous emulsifier solution 1 but contained 114.29 g of a 35% strength by weight aqueous solution of the sodium salt of the sulfuric monoester of ethoxylated alkylphenol (alkyl radical: C$_{12}$; EO degree: 25) = emulsifier solution 3.
FD8: As for FD6, but the initial charge was
  221 g of water,
  44.6 g of stream I,
  1.0 g of ascorbic acid,
  100 g of SDI$_4$
and stream I had the following composition:
  1000 g of 2-ethylhexyl acrylate,
  600 g of n-butyl acrylate,
  160 g of methyl acrylate,
  160 g of methyl methacrylate,
  40 g of styrene,
  40 g of methacrylic acid,
  35.7 g of aqueous emulsifier solution 1,
  1 g of ascorbic acid,
  16 g of 25% strength by weight NaOH solution,
  175 g of water
FD9: A mixture of
  221 g of water,
  1.0 g of ascorbic acid,
  16 g of SDI$_6$
was heated to 90° C. and then admixed all at once with 52.8 g of stream II. Thereafter, while the 90° C. were maintained, stream I (44.8 g in the course of 20 min and the remainder in the course of 3 h) and, starting 20 min after stream I, stream II (in the course of 4 h) were added continuously and the polymerization mixture was then maintained at 90° C. for a further 30 min. To remove residual monomer, the polymerization mixture was cooled down to 60° C. and admixed all at once with stream III and then in the course of 1 h, while the 60° C. were maintained, continuously with stream IV.
  Stream I:
    1960 g of n-butyl acrylate,
    40 g of methacrylic acid,
    1.4 g of aqueous emulsifier solution 1,
    1.0 g of ascorbic acid,
    16 g of 25% strength by weight sodium hydroxide solution
    150 g of water
  Stream II:
    14 g of sodium peroxodisulfate,
    250 g of water
  Stream III:
    40 g of a 10% strength by weight aqueous solution of tert-butyl hydroperoxide
  Stream IV:
    4 g of sodium salt of the hydroxymethanesulfinic acid,
    40 g of water,
    2 g of 1% strength by weight aqueous VOSO$_4$ solution
FD10: As for FD9, except that in the first 20 min 89.6 g of stream I were added continuously.
FD11: As for FD6, but the initial charge was
  221 g of water,
  22.38 g of stream I,
  1 g of ascorbic acid,
  75 g of SDI$_7$ and stream I had the following composition:
1960 g of n-butyl acrylate,
40 g of methacrylic acid,
71.4 g of aqueous emulsifier solution 1,
1 g of ascorbic acid,
16 g of 25% strength by weight aqueous sodium hydroxide solution,
150 g of water FD12: As for FD6, except that the initial charge included not 22.38 g of stream I but 67 g of stream I.

FD13: As for FD6, except that the initial charge included not 22.38 g of stream I but 89 g of stream I.

FD14: A mixture of
10.0 kg of water,
1.95 kg of stream I,
0.8 kg of 30% strength by weight aqueous $H_2O_2$ solution,
2.0 kg of $SDI_5$ was heated to 70° C. and then admixed all at once with 0.425 kg of stream II. While the 70° C. were maintained the batch was left to itself for 10 min for the polymerization to get under way. Thereafter, while the 70° C. were maintained, the polymerization mixture was continuously admixed, starting at the same time, with the remainders of stream I (3.9 kg in the course of 30 min, the rest then in the course of 3 h) and of stream II (in the course of 4.5 h).

Stream I:
78.4 kg of n-butyl acrylate,
1.6 kg of methacrylic acid,
1.6 kg of aqueous emulsifier solution 2,
0.286 kg of aqueous emulsifier solution 1,
15.6 kg of water Stream II:
0.24 kg of ascorbic acid,
0.008 kg of $FeSO_4$,
4 kg of water FD15: A mixture of
10 kg of water,
2 kg of SDIs,
1.88 kg of stream I,
2.29 kg of stream II was heated to 80° C. and then admixed all at once with 0.425 kg of stream III. While 80° C. were maintained, the batch was left to itself for 10 min for the polymerization to get under way. Thereafter, while the 80° C. were maintained, the polymerization mixture was continuously admixed, starting at the same time, with the remainders of stream I (3.8 kg in the course of 30 min, the rest in the course of 3 h), stream II (in the course of 4.5 h) and stream III (in the course of 4.5 h).

Stream I:
78.4 kg of n-butyl acrylate,
1.6 kg of methacrylic acid,
1.6 kg of aqueous emulsifier solution 2
0.286 kg of aqueous emulsifier solution 1,
12.0 kg of water Stream II:
0.457 kg of a 70% strength aqueous tert-butyl hydroperoxide solution,
4.0 kg of water, Stream III:
0.24 kg of ascorbic acid,
0.008 kg of $FeSO_4$,
4.0 kg of water FD16: A mixture of
291 g of water,
1.575 g of ascorbic acid,
0.021 g of $FeSO_4$,
10.5 g of 10% strength by weight aqueous $H_2SO_4$ was heated to 85° C. and then admixed all at once with 31.05 g of stream II. Immediately thereafter, while the 85° C. were maintained, the polymerization mixture was continuously admixed, starting at the same time, with stream I (104 g in the course of 24 min, the rest in the course of 210 min) and the remainder of stream II (in the course of 4 h 15 min).

Stream I:
367 g of water,
121 g of 40% strength by weight aqueous solution of the sodium salt of the sulfuric monoester of ethoxylated isooctylphenol (EO degree: 4)=emulsifier solution 4
0.525 g of ascorbic acid,
33.6 g of 25% strength by weight aqueous NaOH solution,
1764 g of n-butyl acrylate,
262.5 g of methyl methacrylate,
31.5 g of 2-ethylhexyl acrylate,
42 g of acrylic acid Stream II:
300 g of $H_2O$,
10.5 g of sodium peroxodisulfate FD17: A mixture of
1.0 g of ascorbic acid,
5.0 g of $SDI_3$,
44.8 g of stream I,
295 g of water was heated to 85° C. and then admixed all at once with 26 g of stream II. While the 85° C. were maintained the batch was left to itself for 10 min for the polymerization to get under way. Thereafter, while the 85° C. were maintained, the polymerization mixture was continuously admixed, starting at the same time, while the remainders of stream I (in the course of 3 h) and stream II (in the course of 4 h).

Stream I:
1960 g of n-butyl acrylate,
40 g of methacrylic acid,
71.4 g of aqueous emulsifier solution 1,
1 g of ascorbic acid,
16 g of 25% strength by weight aqueous NaOH solution,
150 g of water Stream II:
10 g of sodium peroxodisulfate,
250 g of water Table 1 indicates the solids contents and the volume concentrations of the final dispersions FD1 to FD17 (in % by weight and % by volume, respectively) and also their dynamic viscosities $\eta$ in mPa·s, the $\eta$ determinations having been carried out in accordance with DIN 53019 at 23° C. and at a shear gradient of 487 s$^{-1}$.

Table 2 additionally indicates the final polymer particle size distributions (% by weight of the particles of the final polymer whose particle diameter is $\leq X$ nm, where X is an element of the set {200, 400, 600, 800, 1000, 1200, 1400}).

TABLE 1

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| | | | | | | Final dispensions FD | | | | | | | | | | | |
| Solids content | 65.5 | 64.7 | 71.1 | 71.4 | 71.3 | 71.6 | 70.8 | 70.0 | 71.1 | 71.3 | 70.7 | 71.5 | 71.8 | 70.0 | 70.5 | 65.7 | 71.4 |
| Volume concentration | 60.1 | 62.6 | 65.7 | 66.0 | 65.9 | 66.2 | 65.5 | 66.8 | 65.7 | 65.9 | 65.5 | 66.1 | 66.3 | 65.1 | 65.4 | 60.3 | 66.0 |
| η | 120 | 80 | 360 | 92 | 140 | 800 | 350 | 380 | 490 | 620 | 200 | 240 | 230 | 210 | 190 | 120 | 110 |

TABLE 2

| FD | 0 | 200 | 400 | 600 | 800 | 1000 | 1200 | 1400 |
|---|---|---|---|---|---|---|---|---|
| 1 | 4 | 43 | 57 | 90 | 100 | | | |
| 2 | 15 | 60 | 70 | 100 | | | | |
| 3 | 8 | 23 | 78 | 100 | | | | |
| 4 | 6 | 25 | 28 | 78 | 100 | | | |
| 5 | 17 | 18 | 38 | 100 | | | | |
| 6 | 12 | 18 | 74 | 100 | | | | |
| 7 | 8 | 12 | 25 | 95 | 100 | | | |
| 8 | 4 | 26 | 50 | 100 | | | | |
| 9 | 4 | 35 | 36 | 70 | 95 | 100 | | |
| 10 | 8 | 42 | 44 | 100 | | | | |
| 11 | 6 | 22 | 26 | 75 | 100 | | | |
| 12 | 12 | 23 | 28 | 80 | 100 | | | |
| 13 | 7 | 22 | 26 | 78 | 100 | | | |
| 14 | 12 | 48 | 58 | 67 | 77 | 95 | 100 | |
| 15 | 4 | 28 | 38 | 54 | 66 | 88 | 100 | |
| 16 | 23 | 25 | 90 | 100 | | | | |
| 17 | 11 | 25 | 28 | 95 | 100 | | | |

We claim:

1. A process for preparing a polymer dispersion having a solids volume concentration of at least 50% by volume by polymerizing at least one free-radically polymerizable ethylenically unsaturated monomer other than a vinyl or vinylidene halide with the addition of at least one aqueous starting polymer dispersion I in a polymerization vessel by the method of free radical aqueous emulsion polymerization in the presence of dispersants and free radical polymerization initiators, wherein a) the mass of starting polymer I present in the at least one added aqueous starting polymer dispersion I is relative to the total mass, comprising the mass of the at least one free-radically polymerizable monomer and the mass of starting polymer I added in the form of the aqueous starting polymer dispersion I, from 0.1 to 10%, b) the starting polymer I is present in the at least one aqueous starting dispersion I in the form of dispersed starting polymer particles of whose total mass at least 99.6% by weight have a non-zero particle diameter of a 90 nm to ≦500 nm, c) the total amount of the at least one aqueous starting polymer dispersion I to be added is introduced into the polymerization vessel as initial charge prior to the start of free radical aqueous emulsion polymerization, d) in a first polymerization stage, in the presence of the initial charge of aqueous starting polymer dispersion I, initially an aliquot of from 25 to 500% by weight of the total mass of the at least one monomer to be free-radically polymerized, based on the mass of the initial charge of starting polymer I, is polymerized in a conventional manner to a conversion of at least 80 mol %, based on this aliquot, e) following the first polymerization stage the polymerization of the remainder of the at least one monomer to be free-radically polymerized is performed by the feed stream addition method with the proviso that from the start of the feed stream addition method the addition of the at least one free-radically polymerizable monomer to the polymerization vessel is performed in such a way that at any time of the addition the polymerization conversion of the total monomers already added previously to the polymerization vessel is at least 80 mol %, and f) the amount of dispersant present in the polymerization vessel is at any time from the start of the free radical aqueous emulsion polymerization from 0.5 to 5% by weight, based on the sum of the masses already introduced into the polymerization vessel of starting polymer I and of monomers to be polymerized.

2. The process of claim 1, wherein in part b), said dispersed starting polymer particles have a total mass of at least 99.6% by weight of particles having a non-zero particle diameter of >110 nm to 500 nm.

3. The process of claim 1, wherein, in part d), said aliquot is from 50 to 300% by weight, of the total mass of the at least one monomer to be free radically polymerized.

4. The process of claim 1, wherein, in part d), said aliquot is polymerized in a conventional manner to a conversion of at least 90 mol %.

5. The process of claim 1, wherein, in part f), the amount of dispersant present at any time during polymerization is from 0.5 to 3% by weight.

6. The process of claim 1, wherein said polymer dispersion comprises a polymer prepared from:

from 70 to 100% by weight of esters of acrylic or methacrylic acid or a mixture thereof with alkanols of from 1 to 12 carbon atoms or styrene or a mixture thereof; or from 70 to 100% by weight of styrene or butadiene or a mixture thereof.

7. The process of claim 1, wherein said polymer dispersion has a solids volume concentration of >65% by volume.

* * * * *